United States Patent
Hsieh

(10) Patent No.: US 6,791,720 B1
(45) Date of Patent: Sep. 14, 2004

(54) PORTABLE SCANNING APPARATUS

(75) Inventor: Vincent Hsieh, Taoyuan (TW)

(73) Assignee: Lite-on Technology Corporation, Taipei (TW)

( * ) Notice: Subject to any disclaimer, the term of this patent is extended or adjusted under 35 U.S.C. 154(b) by 647 days.

(21) Appl. No.: 09/628,793

(22) Filed: Jul. 28, 2000

(51) Int. Cl.[7] .......................... H04N 1/024; H04N 1/32; H04N 1/04
(52) U.S. Cl. .................. 358/473; 358/442; 358/496
(58) Field of Search ................. 358/473, 472, 358/442, 474, 496, 498, 505, 506, 487, 483, 482, 514, 512, 513; 382/313, 318, 319, 312; 710/12, 13, 15; 250/208.1, 234–236; 361/686, 683

(56) References Cited

U.S. PATENT DOCUMENTS

| 5,864,410 A | 1/1999 | McVicar ..................... 358/474 |
| 5,956,158 A | 9/1999 | Pinzarrone et al. ......... 358/474 |
| 6,275,309 B1 * | 8/2001 | Hu et al. .................... 358/473 |
| 6,459,506 B1 * | 10/2002 | Hu et al. .................... 358/473 |

* cited by examiner

Primary Examiner—Cheukfan Lee
(74) Attorney, Agent, or Firm—Rabin & Berdo, P.C.

(57) ABSTRACT

A portable scanning apparatus comprising a scanner and a feeder. The scanner is connected to a host by a USB line through which the power of the scanner is provided. The scanner includes an application specific integrated circuit (ASIC) and an image sensing module for controlling the scanning apparatus. The image sensing module is used for receiving image signals from the document which are further outputted to the ASIC. The scanner can be selectively combined with a feeder as a sheet-fed scanner or detached from the feeder as a hand-held one. The feeder includes a motor for controlling the rolling wheel of the feeder and battery for supplying the power of the feeder.

17 Claims, 5 Drawing Sheets

PORTABLE SCANNING APPARATUS

BACKGROUND OF THE INVENTION

This application incorporates by reference Taiwanese application Serial No. 89106926, Filed Apr. 13, 2000.

1. Field of the Invention

The invention relates in general to a portable scanning apparatus, and more particularly to a portable scanning apparatus including a scanner and a sheet feeder which can be combined with or detached from the scanner alternatively.

2. Description of the Related Art

These days, image-capturing devices play an important role in multimedia and computer advancements. At the same time, manufacturers are making great efforts to develop scanners with a relatively lower cost, lower power dissipation, and featured with easy manipulation.

For example, a universal serial bus (USB) powered scanner is described in U.S. Pat. Nos. 5,956,158 and 5,864,410. Although there have been many improvements in the design of this scanner, the cost is relatively higher than conventional scanners owing to its design complexity.

Currently, there exists two portable scanners on the market, one is the Attache scanner shipped by the Antec company while the other is the PetiScan by the NEC company. The Attache scanner is sheet-fed only so that it can only be used to scan papers but not books. The Petiscan is a flatbed scanner which occupies larger space than the sheet-fed one and so the Petiscan scanner has more inconvenience in usage.

SUMMARY OF THE INVENTION

It is therefore a primary object of the invention to provide a portable scanning apparatus which uses a USB line connected to a host and a battery as a power supply without additional electric wires, thereby largely reducing the cost. In addition, the scanning apparatus can be alternatively sheet-fed or hand-held as needed.

In order to accomplish the object of the present invention, a scanning apparatus is provided which includes a scanner and a sheet feeder. The scanner is connected to a host by a USB line which serves as the power supply for the scanner. The scanner includes an applied or application specific integrated circuit (ASIC), for controlling the scanning apparatus, and an image sensing module for receiving image signals from the scanned document and inputting the image signals to the ASIC. The battery powered feeder includes a motor for driving a rolling wheel of the feeder to deliver the document. The feeder can be selectively combined with the scanner so that the document to be scanned can be delivered by the feeder, or detached from the scanner so that it can be delivered by hand.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
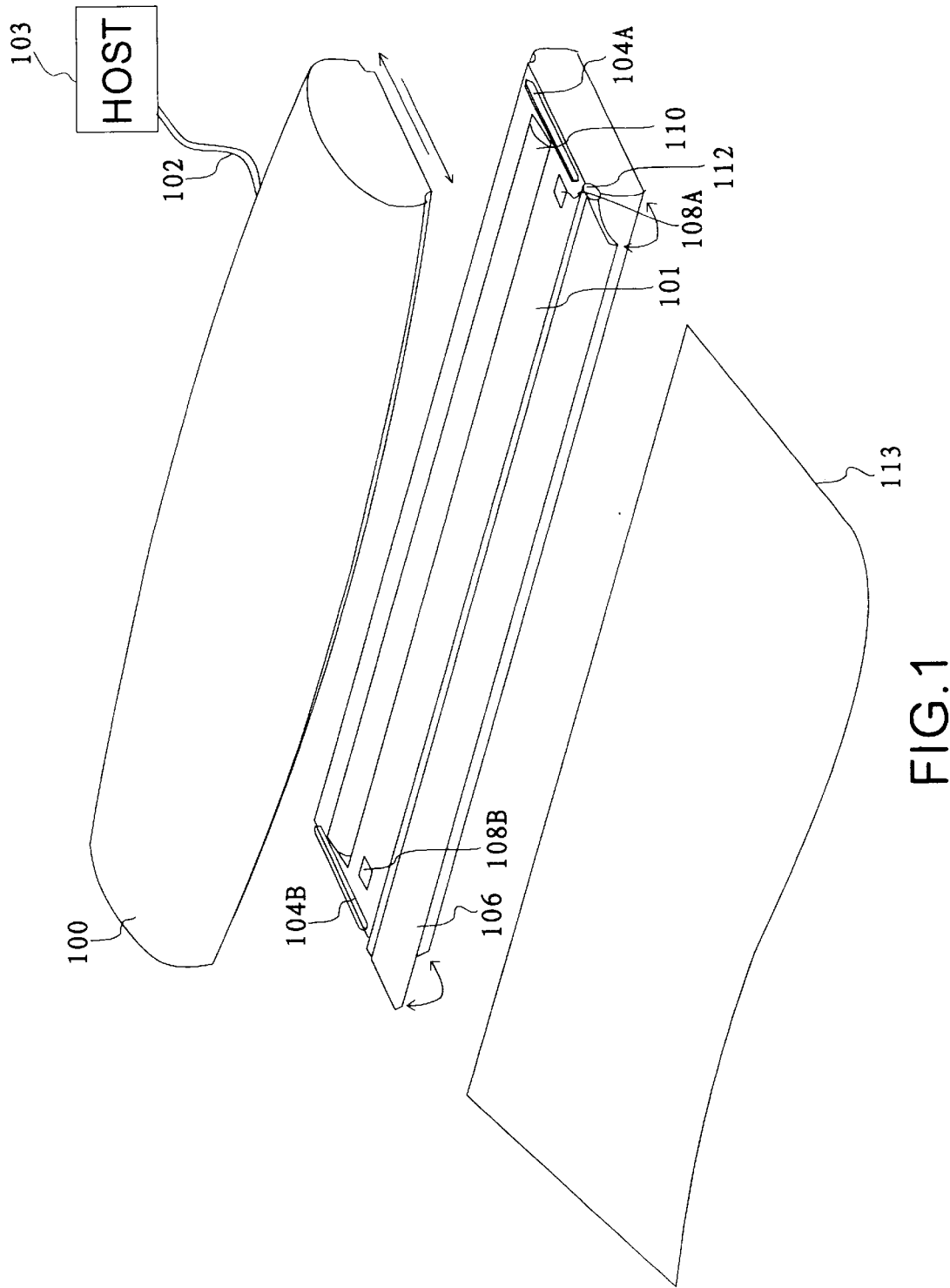
FIG. 1 is a three-dimensional exterior diagram of a portable scanning apparatus according to a preferred embodiment of the invention.

As illustrated in FIG. 1, the scanning apparatus includes a scanner 100 and a feeder 101. The scanner 100 is connected to a host 103 by a USB line 102, which serves as the power supply of the scanner 100. The feeder 101 uses grooves 104A and 104B to connect with the scanner 100 snugly. The scanner 100 can be combined with the feeder 101 as a sheet-fed scanner or alternatively be detached from the feeder 101 as a hand-held scanner. In addition to the grooves 104A and 104B, the feeder 101 further includes a flatbed 106, positioning sensors 108A and 108B, a rolling wheel 110, and a roller 112. The flatbed 106 is fixed on the scanner 101 by the roller 112 and used for placing the document 113 to be scanned. The rolling wheel 110 helps to deliver the document 113 to be scanned vertically to the longitudinal axis of the flatbed. The positioning sensors 108A and 108B (e.g. electronic sensors) are respectively located on two sides of the feeder 101 for sensing the document 113.

Figure 2:
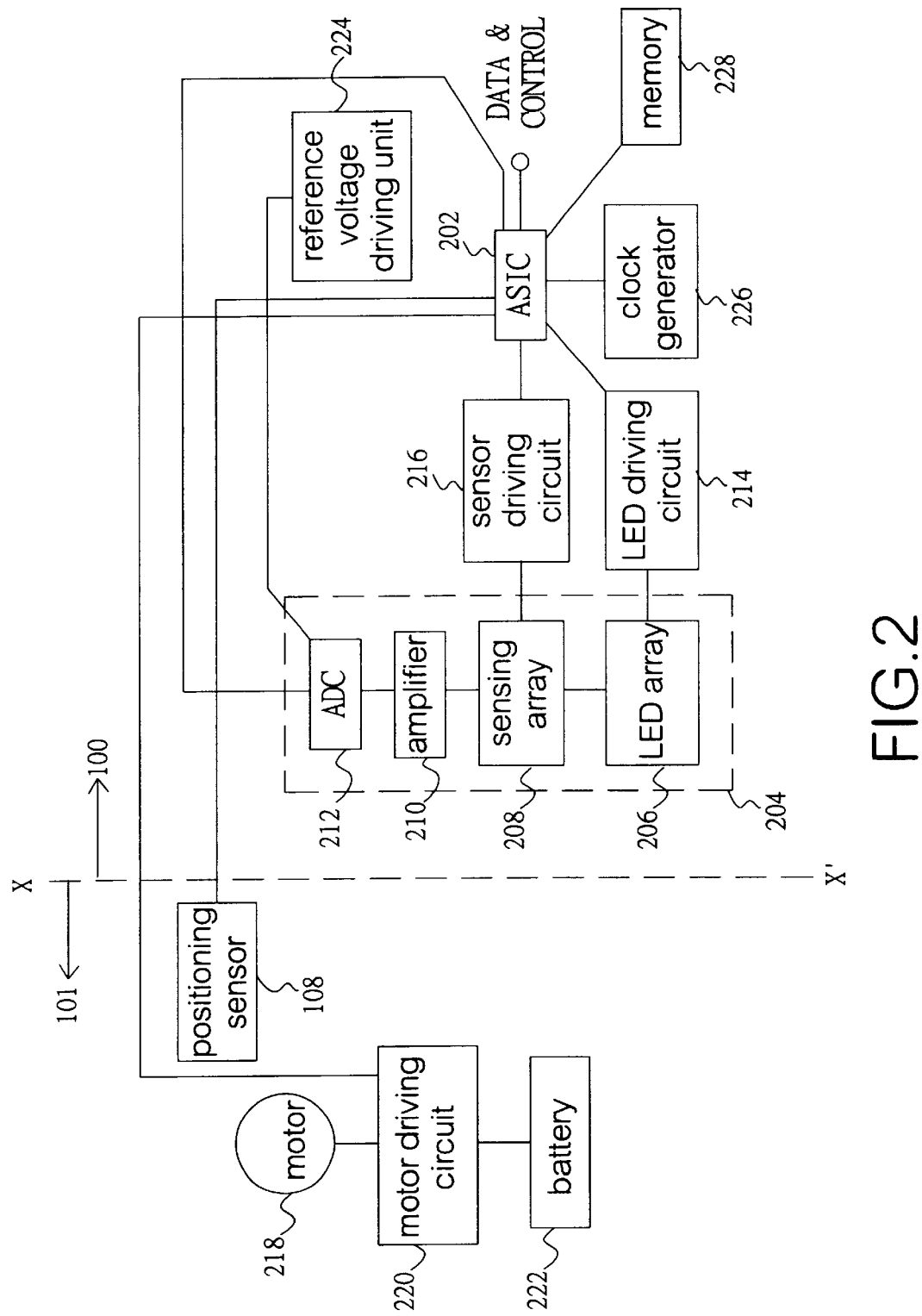
FIG. 2 is an inner circuit block diagram of a portable scanning apparatus according to a preferred embodiment of the invention.

As diagramed in FIG. 2, the right part of the line XX' depicts a block diagram of inner circuits of the scanner 100 while the left part depicts a block diagram of inner circuits of the feeder 101. The scanner 100 includes an ASIC 202 for controlling the scanning apparatus and a contact image sensor (CIS) module 204 for receiving image signals from the scanned document 113, which are further sent out to the ASIC 202.

Moreover, the CIS module 204 includes a light emitting diode (LED) array 206, a sensing array 208, an amplifier 210, and an analog to digital converter (ADC) 212. The LED array 206 emits light on the document 113 to generate image signals corresponding to the document 113, which is further received by the sensing array 208. The received image signals will be processed by the amplifier 210 and the ADC 212 and then outputted to the ASIC 202. In addition to the above devices, the scanning apparatus further includes an LED driving circuit 214 for controlling the LED array 206 and a sensor driving circuit 216 for controlling the sensing array 216.

The feeder 101 includes a motor 218, motor driving circuit 220, and battery 222. The motor 218, controlled by the motor driving circuit 220, drives the rolling wheel 110 of the feeder 101 to deliver the document 113. The positioning sensors 108A and 108B detect the front edge of the document 113, and the battery 222 is used as power supply of the feeder 101. When the feeder 101 is combined with the scanner 100 to deliver the document 113, the motor driving circuit 220 will receive the control signals from the ASIC 202 to drive the motor 218.

In addition, the scanner 100 includes a reference voltage driving unit 224, a clock generator 226, and a memory 228. The reference voltage driving unit 224 provides the ADC 212 with a suitable reference voltage in order to make the analog to digital conversion correctly. The clock generator 226 generates clock signals inputted to the ASIC 202 to synchronize the circuit action in the scanner 100. The memory 228 is used to record the correction values produced after the scanning apparatus is calibrated.

Figure 3:
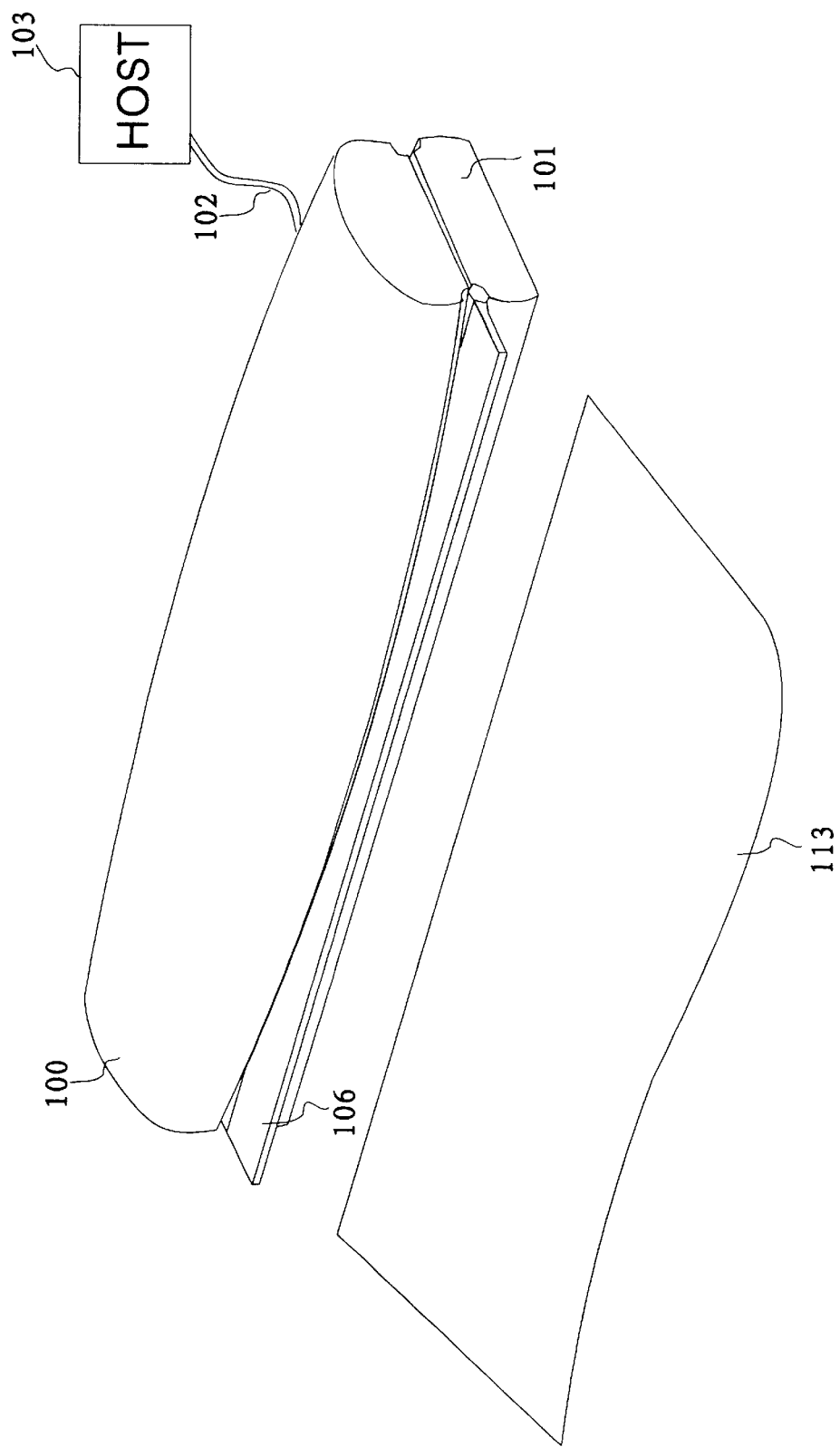
FIG. 3 is a three-dimensional diagram of the scanning apparatus as the document is delivered by its feeder.

As seen in FIG. 3 together with FIG. 1 and FIG. 2, the scanning apparatus has to be calibrated before scanning the document 113, (e.g. the calibration of the gray level in color) and the correction values are stored in the memory 228. The host 103 transmits a control signal CONTROL to the ASIC 202 for driving the scanning apparatus to scan. The document 113 to be scanned is placed on the flatbed 106 before being scanned. When the positioning sensors 108A and 108B detect the front edge of the document 113, they will send out signals to the ASIC 202 to start scanning. Subsequently, the ASIC 202 will further transmit a control signal to drive the motor 218 to deliver the document 113.

In the scanning process, the sensing array 208 receives image signals DATA from the document 113 after the LED array 206 emits light on the document 113. The image signals DATA, processed by the amplifier 210 and the ADC 212, are outputted to the ASIC 202 by the ADC 212 and further transferred to the host 103 by the USB line 102. The LED array 206 and the sensing array 208 are controlled by the ASIC 202 respectively via the LED driving circuit 214 and the sensor driving circuit 216.

Although there are two positioning sensors 108A and 108B used in the embodiment, one positioning sensor 108A or 108B is enough to detect the front edge of the document 113 and start the scanner 100. However, by using the sensors 108A and 108B together, it can be detected if the document 113 deviates from the original position in the delivering process. That is, the document 113 has deviated from the paper position as delivered into the feeder 101 if only one of the two positioning sensors 108A and 108B detects the document 113. As this happens, it reminds the user to reset the document 113 or stop scanning to prevent further mistakes.

Figure 4:
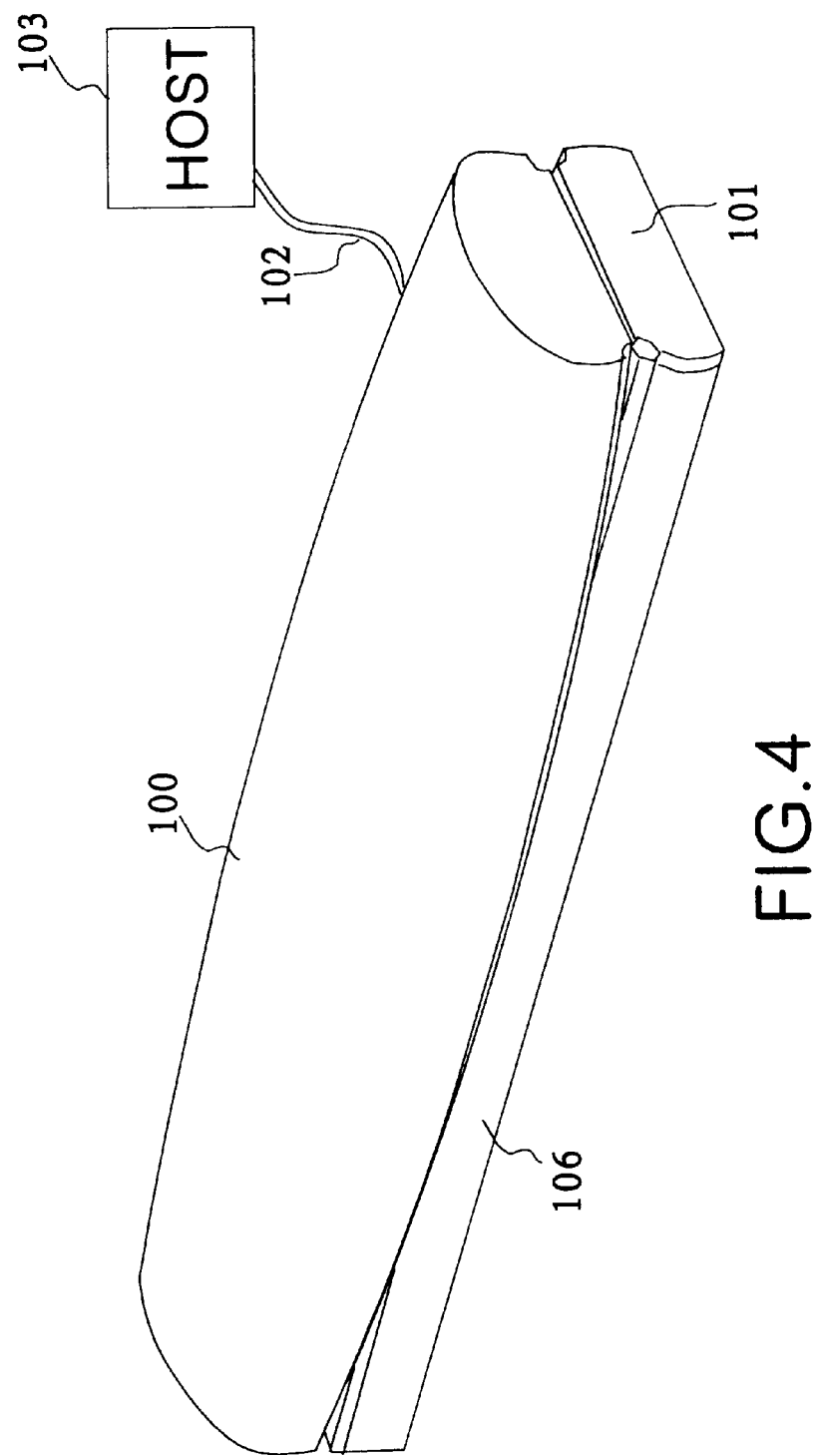
FIG. 4 is a three-dimensional diagram of the scanning apparatus as it is not used.

As depicted in FIG. 4, if the scanning apparatus is not used, the flatbed 106 can be turned to stand upward to save the space occupied by the scanning apparatus.

Figure 5:
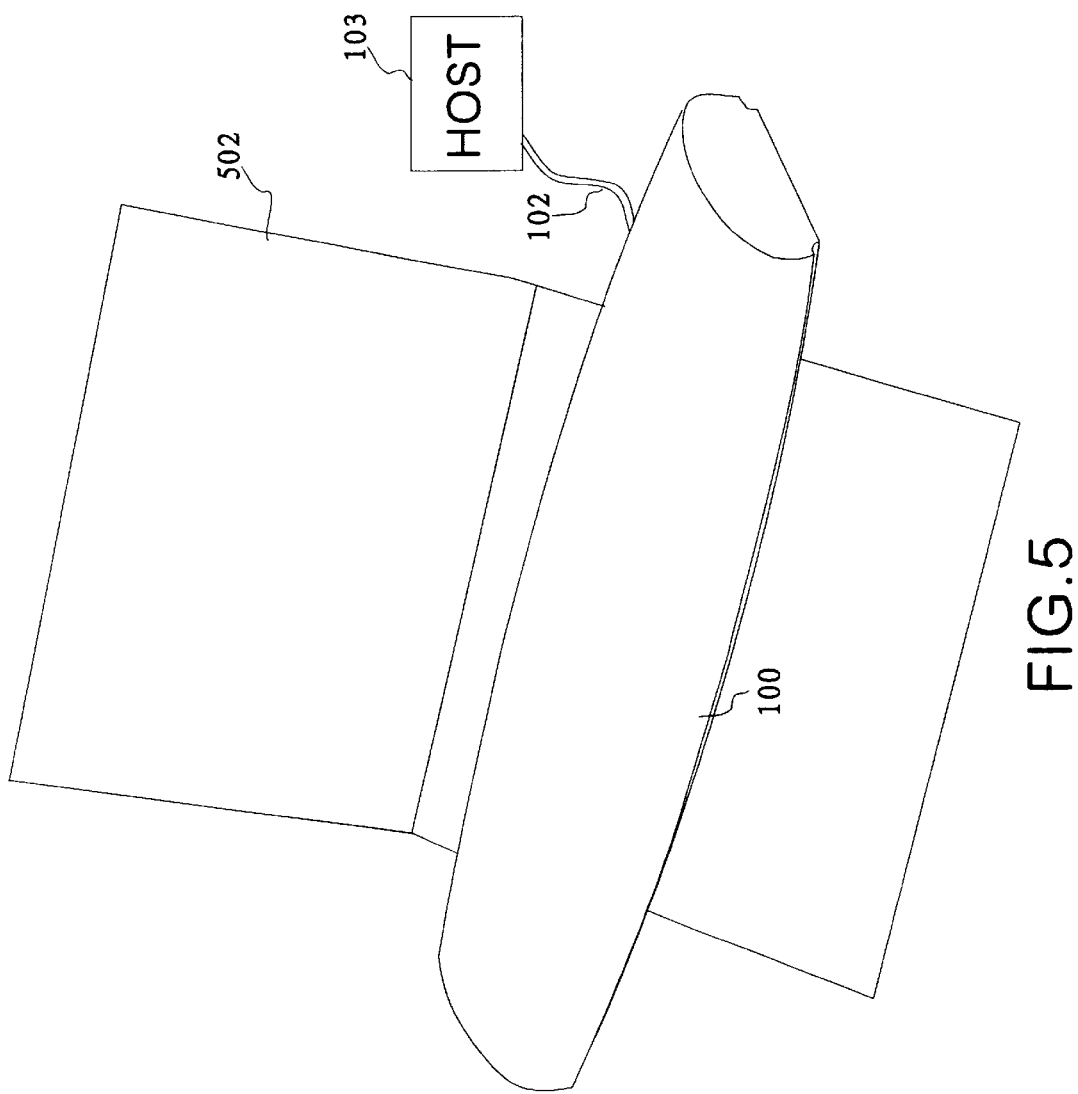
FIG. 5 is a three-dimensional diagram of the scanning apparatus as the feeder is detached from the scanner and the document is delivered by hand.

Referring to FIG. 5, if the documents or pictures to be scanned are not paper-formed, such as the book 502, the documents cannot be delivered by the feeder. Therefore, the documents can be scanned by hand-held type of the scanner.

The main features of the invention lie on the fact that the power of the scanner 100 is supplied by the host 103 via the USB line 102 while the power of the feeder 101 is supplied by battery 222. Therefore, it is not necessary to gain power from a plug via the electric wires. Since the scanning apparatus uses two different power supplies respectively for the scanner 100 and the feeder 101, it is simpler to design as compared to conventional ones which uses complicated circuits to gain power without any extra electric wire.

Moreover, the scanner 100 and the feeder 101 in the scanning apparatus can be separated when necessary. If the feeder 101 is detached from the scanner 100, the document 113 to be scanned is delivered by hand. If the feeder 101 is combined with the scanner 100, the scanning apparatus is sheet-fed. It can be seen that a charge couple device (CCD) can also replace the CIS module 204 mentioned above in order to attain the same result.

The characteristics of the invention are as follows:

The scanning apparatus according to the invention uses the USB line for connecting to a host and also the battery as power supply for the feeder. The electric wires used for gaining power in the typical scanner are never needed so that the cost can be greatly reduced. In addition, the scanning apparatus is alternatively sheet-fed or hand-held as needed, thereby increasing the convenience in usage.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A portable scanning apparatus for use with a host and a universal serial bus (USB) line, comprising:
    a scanner connected to the host by the universal serial bus (USB), wherein power is provided to the scanner via the USB, and wherein the scanner includes
        an application specific integrated circuit (ASIC) for controlling the portable scanning apparatus; and
        an image sensing module for receiving a plurality of image signals of a document and outputting the image signals to the ASIC; and
    a feeder for selective connection to the scanner, wherein the feeder can either be combined with the scanner or detached from the scanner and wherein the feeder includes
        a motor for moving the document in the feeder; and
        a battery for supplying power to the feeder.

2. The portable scanning apparatus according to claim 1, wherein the image sensing module comprises a charge-coupled device (CCD).

3. The portable scanning apparatus according to claim 1, wherein the image sensing module comprises a contact image sensor (CIS) module.

4. The portable scanning apparatus according to claim 3, wherein the CIS module comprises a light emitting diode (LED) array.

5. The portable scanning apparatus according to claim 4, wherein the scanner further comprises an LED driving circuit for controlling the LED array.

6. The portable scanning apparatus according to claim 4, wherein the CIS module further comprises:
    a sensing array for receives the image signals from the document;
    an amplifier for amplifying the image signals from the sensing array; and
    an analog to digital converter (ADS) for transmitting the image signals from the amplifier to the ASIC.

7. The portable scanning apparatus according to claim 6, wherein the scanner comprises a sensor driving circuit for controlling the sensing array.

8. The portable scanning apparatus according to claim 1, wherein the feeder comprises a motor driving circuit for controlling the motor.

9. The portable scanning apparatus according to claim 8, wherein the ASIC controls the motor driving circuit to drive the motor for delivering the document when the scanner is used together with the feeder.

10. The portable scanning apparatus according to claim 1, wherein the feeder comprises a positioning sensor for detecting the front edge of the document.

11. The portable scanning apparatus according to claim 10, wherein the positioning sensor is an electronic sensor.

12. The portable scanning apparatus according to claim 1, wherein the feeder comprises two positioning sensors respectively located on two sides of the feeder.

13. The portable scanning apparatus according to claim 1, wherein the feeder comprises a flatbed for placing the document.

14. The portable scanning apparatus according to claim 1, wherein the feeder comprises a plurality of grooves for connecting the feeder to the scanner tightly.

15. The portable scanning apparatus according to claim 1, wherein the scanner is operable without the feeder to scan the document in a hand-held mode, and is operable with the feeder to scan the document in a sheet-feed mode.

16. A portable scanning apparatus for use with a host and a USB line, comprising:
- a scanner connected to the host by a the USB line, wherein power is provided to the scanner via the USB line and wherein the scanner includes
  - an ASIC for controlling the portable scanning apparatus; and
  - a CIS module for receiving a plurality of image signals from a document and outputting the image signals to the ASIC;
- and a feeder for selective connection to the scanner, and wherein the feeder includes
  - a motor for moving a document in the feeder;
  - a motor driving circuit for controlling the motor; and
  - a battery for supplying power to the feeder;

wherein the ASIC controls the motor driving circuit to drive the motor when the feeder is connected to the scanner and the document is delivered by the feeder.

17. The portable scanning apparatus according to claim 16, wherein the scanner is operable without the feeder to scan the document in a hand-held mode, and is operable with the feeder to scan the document in a sheet-feed mode.

* * * * *